Sept. 2, 1969  J. H. BERTIN  3,464,365
VEHICLE GUIDING TRACKS
Filed March 28, 1967  3 Sheets-Sheet 1
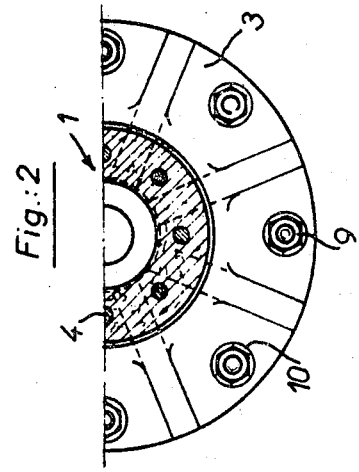
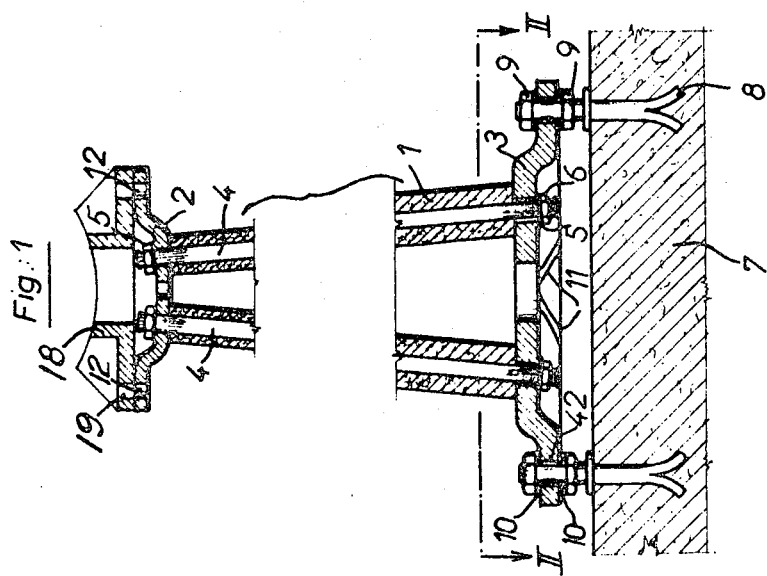

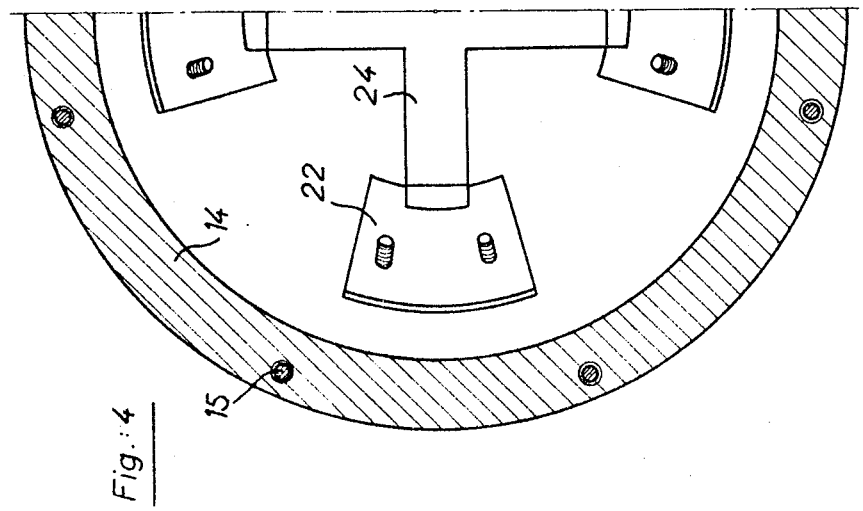
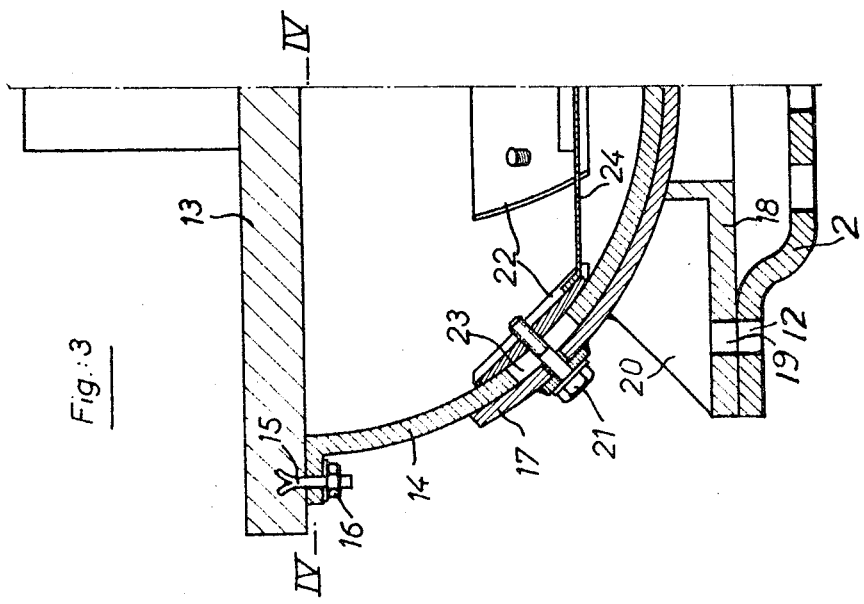

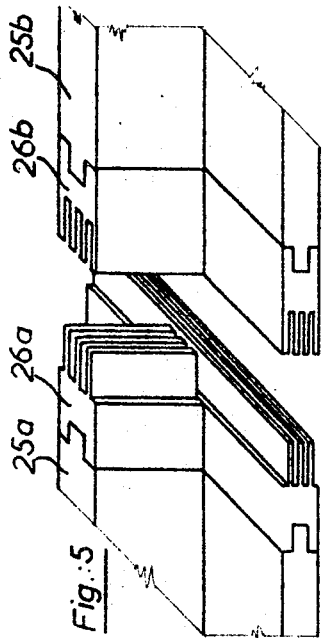
Fig. 5
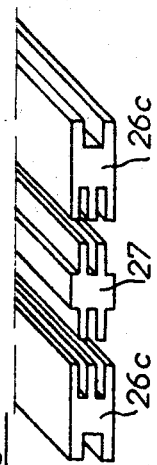
Fig. 6
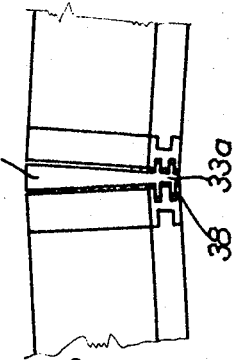
Fig. 9
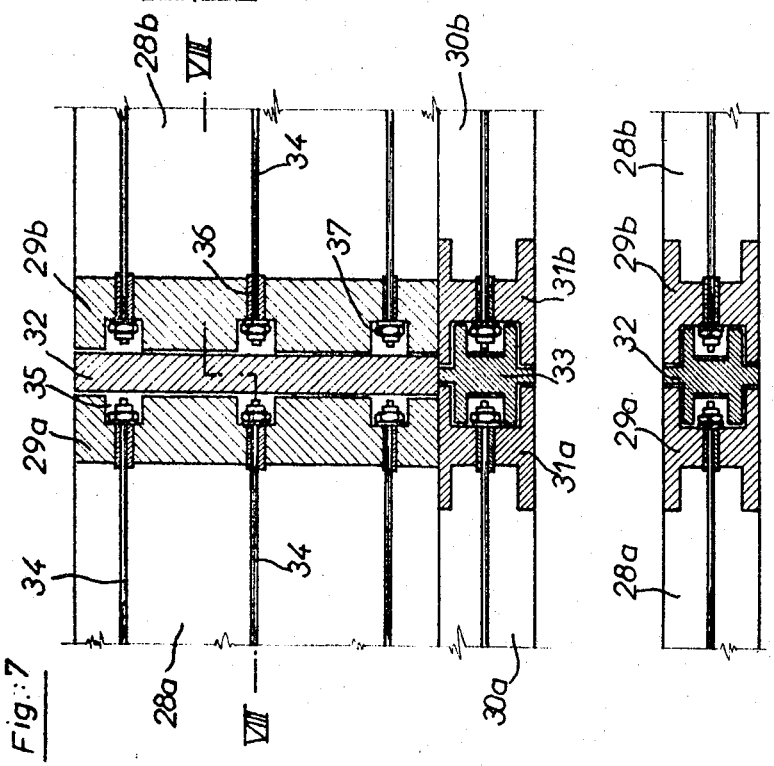
Fig. 7
Fig. 8

United States Patent Office 3,464,365
Patented Sept. 2, 1969

3,464,365
VEHICLE GUIDING TRACKS
Jean Henri Bertin, Neuilly-sur-Seine, France, assignor to
Bertin & Cie, Plaisir, France, a French company
Filed Mar. 28, 1967, Ser. No. 626,509
Claims priority, application France, Mar. 30, 1966,
55,721
Int. Cl. E04h 12/16; E01b 25/08
U.S. Cl. 104—125          7 Claims

ABSTRACT OF THE DISCLOSURE

A track for a vehicle travelling with a ground effect including sections fitted endwise at a predetermined height above ground and secured to towers anchored in the ground by means adjusting the height and location of the head of the tower. The track is secured to the tower by pivoting means and its sections are interconnected by end-pieces.

---

The present invention has for its object tracks on which vehicles chiefly those borne and guided by means of cushions of compressed fluid are adapted to run.

The invention has for its object to further the execution and assembly of the successive track sections. According to the invention, a track is used which is carried above ground by towers or pillars and includes at least one of the following means:

A block anchoring the towers or pillars in the ground so as to allow adjusting the height or slope with reference to verticality of said track-carrying tower or pillar.

Means for securing the track to the head of the tower by means of a pivotal link system for instance of the cylinder or rotula type.

Means for interconnecting the successive track sections through inserted end-pieces which allow in particular the expansion of said sections and their relative positioning.

It may be of advantage to make the track rest on concrete uprights but concrete works under poor flexional conditions so that it is necessary to subject it to a preliminary stressing. It is of interest to design the anchoring means according to the invention in a manner such that the ends of the tower or pillar are provided with two metal parts serving respectively for securing the track over the tower and the tower to an anchoring block by means of ties which allow the adjustment referred to and serving furthermore for the anchoring of the preliminary stressing ties acting on the concrete tower.

The inserted end-pieces adapted to connect successive sections forming the track are made of metal and are provided advantageously with rabbets and ribs provided for the interengagement of the track sections and end-pieces. This provides a perfect adjustment of the track sections with one another together with fluidtightness and absorption of longitudinal expansion. It is also possible to resort to end-pieces, the ribs and rabbets of which are identical so as to cooperate with an intermediate member.

Furthermore, when the track sections are made of concrete the end-pieces may serve as bearing means clamping the cables or rods serving for the prestressing of the concrete. Such an arrangement allows a considerable simplification of the structure.

The following description discloses by way of example and in a non-limiting sense the invention which will be thus readily understood, reference being made to the accompanying drawings wherein:

FIG. 1 is a longitudinal cross-sectional view of a tower carrying the track, lower fixing means of which are shown;

FIG. 2 is a half-section of the tower through line II—II of FIG. 1;

FIG. 3 is a half-section of a rotula bearing with the upper fixing means of the column being shown;

FIG. 4 is a cross-section through line IV—IV of FIG. 3;

FIGS. 5 and 6 illustrate the connection between two track sections by means of inserted end-pieces;

FIG. 7 is a sectional view of an embodiment of the connection provided by inserted end-pieces;

FIG. 8 is a cross-section through line VIII—VIII of FIG. 7;

FIG. 9 illustrates diagrammatically the assembly between two track sections the slopes of which are different.

Obviously, the features appearing both in the specification and in the drawings form part of the invention.

Turning to FIGS. 1 and 2, a hollow tower 1 made of concrete in the example illustrated carries at its upper end a shoe 2 to which the track, not illustrated, is secured. The tower 1 rests through its lower end on a further shoe 3. The upper and lower shoes 2 and 3 are rigidly secured to said tower 1 by ties 4 extending through the tower, as provided by openings designed for this purpose. The ties 4 can be tensioned by nuts 5, locking nuts 6 being fitted between the nuts 5 and the corresponding shoe 2 or 3. The ties allow subjecting the concrete tower to a preliminary stressing which improves its mechanical behaviour. The lower shoe 3 is secured to a concrete anchoring block 7 through the agency of split pins 8 extending through ports 42 in the shoe and associated with nuts 9 so as to allow adjusting the height and slope of the tower 1. Friction washers 10 provide for the secure positioning of the nuts 5.

By reason of the large weight to which such towers may be subjected, the shoes 2 and 3 are reinforced by ribs 11. The upper shoe 2 is furthermore provided with bores 12 which allow securing the track on said shoe.

FIGS. 3 and 4 illustrate a rotula bearing member through which the track can be secured to a tower, while matching the required slope of the track.

The track 13, made of concrete in the example illustrated, is in the shape of an inverted T, while a semi-spherical rotula 14 is secured to the said track through the threaded split pins 15 and nuts 16. In certain cases it is possible to resort to a cylindrical pivot the generating lines of which are advantageously parallel wtih the longitudinal direction of the track.

The rotula 14 is fitted on a cradle 17 and forms therewith a ball-and-socket system which is carried on a base plate 18 having bores 19 for fixation to the upper end shoe 2 of column 1 shown in FIGURE 1. Ribs 20 impart rigidity to the base plate 18.

The rotula 14 is rigidly secured to the cradle 17 by bolts 21 screwed into tapped holes formed in the clamping plates 22. In registry with the bolts 21, slots 23 formed in the rotula 14 allow adjusting the angular position of said rotula, whereby it is possible to give the track the desired slope.

In order to further the positioning of the bolts 21, a cross-shaped metal sheet 24 is welded to the different clamping plates 22 which allows positioning the tapped holes formed in the clamping plates in substantial registry with the holes provided in the cradle 17 for the passage of said bolts 21.

FIG. 5 illustrates the assembly of two prefabricated sections adapted to form the track. The first section 25a made of plastics such as polyester or else of concrete is provided with an inserted metal end-piece 26a including male tongues adapted to cooperate with the female rabbets of a metal end-piece 26b secured to the next track section 25b. With such assembling means, the rabbets may show a slight clearance when engaging the tongues so as to further the adjustment of the relative position of said track sections. The end-pieces may be secured to the track sections by bolts the heads of which are embedded within recesses formed in said end-pieces.

The assembly by means of inserted end-pieces allows adjusting perfectly said sections with reference to one another while it ensures fluidtightness and provides for longitudinal expansion.

As a modification, it is possible to resort to inserted metal end pieces 26c of the type illustrated in FIG. 6. Said end-pieces are all identical and it is then necessary to resort to an intermediate member 27 which allows interconnecting two successive end-pieces and the assembly thereof since the track elements are perfectly symmetrical.

FIGS. 7 and 8 illustrate a possible embodiment of the arrangement illustrated diagrammatically in FIG. 6. The rail in the shape of an inverted T includes a first section 28a carrying on its vertical flange a metal end-piece 29 the shape of which is that illustrated in the drawing. A metal end-piece 29b identical with the metal end-piece 29a is rigidly secured to the vertical flange of the second section of the rail.

Similarly, the horizontal flange 30a of the first rail section carries a metal end-piece 31a. The horizontal flange 30b of the second rail element is also provided with a metal end-piece 31b. An intermediate member 32 ensures the assembly between the vertical flanges of the two rail elements. Similarly, an intermediate member 33 ensures the assembly between the horizontal flanges of the two adjacent rail elements.

It is necessary to provide a slight clearance between the intermediate assembling plates or members 32 and 33 and the end-pieces 29 and 31 so as to allow a longitudinal expansion of the rail.

The rail sections as illustrated are made of concrete and are subjected to a preliminary stressing by metal cables 34 extending through the rail sections and possibly through the metal end-pieces forming extensions of the latter. Said metal end-pieces may serve as bearing members for the ends of the cables 34 which cables can thus be tightened. The ends of the cables 34 are held in this case inside threaded sleeves 36 beyond which they project. Recesses 35 are provided in the end-pieces for housing nuts 37 threadedly engaging the sleeves 36 so as to give the cables the tensioning required for a suitable prestressing of the concrete taking into account the load to which the rail is to be subjected.

In the case where the slopes of two successive rail sections are different, it is necessary to provide when assembling the vertical flanges of said rail sections an intermediate wedge or shim-shaped plate such for instance as that illustrated at 35 in FIG. 9.

In such a case, it may be necessary to give the horizontal transverse ribs or male projections 33a on the intermediate plate 33 a slope ensuring the assembly between the horizontal flanges of the rail. Obviously, the above disclosure is to be considered by way of a mere exemplification and many modifications may be brought thereto and for instance technically equivalent means may be substituted for those described without widening the scope of the invention as defined in the accompanying claims. In particular, it is possible to provide a vertical adjustment of the towers or pillars at the upper ends of the latter immediately underneath the rotulas instead of providing such an adjustment at the lower ends of said towers or pillars.

I claim:
1. A track system for ground effect machines movable along an elevated trackway with the interposition of pressure fluid cushions, said trackway being formed of successive sections fitted end to end and supported by a plurality of spaced columns carried on foundations, wherein the improvement comprises a foot bearing device interconnecting the lower end of said columns and said foundations and including means for adjusting the height and inclination of said columns with respect to said foundations, and a head bearing device interconnecting the upper end of said columns and said trackway sections and including means for adjusting the relative angular position thereof.

2. Track system as claimed in claim 1, wherein said foundations comprise an anchoring block and said foot bearing device comprises a base plate fast with the respective column at the lower end thereof, anchor members fastly embedded in said anchoring block and projecting therefrom, and adjustable coupling means securing said base plate to said anchor members.

3. Track system as claimed in claim 2, wherein said base plate is bored, said anchor members have threaded projections engaged through the bores of said base plate, and said coupling means comprise nuts screwed on said threaded projections.

4. Track system as claimed in claim 1, wherein said columns are made of prestressed reinforced concrete and include prestressing reinforcement ties extending therealong between said lower end and said upper end thereof, and said bearing devices comprise shoes fitted at the respective ends of each column, said shoes being connected to said ties to form backing plates therefore transferring prestress from said ties to the concrete, said height and inclination adjusting means being interposed between the lower end shoe and the respective foundation and said angular position adjusting means being interposed between the upper end shoe and the respective trackway section.

5. Track system as claimed in claim 1, wherein said relative angular position adjusting means comprises a ball-and-socket system, the components of which are respectively fast with said columns and said trackway sections.

6. Track system as claimed in claim 1, wherein the ball component is secured under a trackway section and the socket component is secured above a column.

7. A track system for vehicles progressing with a ground effect over a fluid cushion comprising a plurality of towers, a track including a number of sections interconnected endwise, anchoring means for the towers, and pivotal means through which the track sections are supported at the upper ends of the towers, each pivotal means comprising a member of revolution rigid with the track and a correspondingly shaped cradle carried by the upper end of the corresponding tower and carrying said member of revolution.

References Cited
UNITED STATES PATENTS

| 2,993,647 | 7/1961 | Deller | 104—118 |
| 3,111,093 | 11/1963 | Jay | 104—23 |
| 3,225,703 | 12/1965 | Lemcke | 104—125 |

ARTHUR L. LA POINT, Primary Examiner

R. A. BERTSCH, Assistant Examiner

U.S. Cl. X.R.
104—23